(12) United States Patent
Maclay

(10) Patent No.: US 7,347,659 B2
(45) Date of Patent: *Mar. 25, 2008

(54) VEHICLE MOUNTED BALE PICK-UP AND FEEDER

(76) Inventor: Thomas B Maclay, 17005 Old Hwy. 93, Florence, MT (US) 59833

( * ) Notice: Subject to any disclaimer, the term of this patent is extended or adjusted under 35 U.S.C. 154(b) by 0 days.

This patent is subject to a terminal disclaimer.

(21) Appl. No.: 11/519,506

(22) Filed: Sep. 11, 2006

(65) Prior Publication Data

US 2007/0059126 A1 Mar. 15, 2007

Related U.S. Application Data

(63) Continuation of application No. 10/508,382, filed as application No. PCT/US03/08870 on Mar. 21, 2003, now Pat. No. 7,121,783.

(60) Provisional application No. 60/367,538, filed on Mar. 22, 2002.

(51) Int. Cl.
*A01D 87/12* (2006.01)
(52) U.S. Cl. ..................... 414/703; 414/24.5
(58) Field of Classification Search ......... 414/703, 414/24.5, 680, 685, 800
See application file for complete search history.

(56) References Cited

U.S. PATENT DOCUMENTS

| 2,321,168 A | 6/1943 | Tognetti |
| 2,848,127 A | 8/1958 | Grey |
| 3,348,707 A | 10/1967 | Anstee |
| 3,401,810 A | 9/1968 | Grey |
| 3,412,882 A | 11/1968 | Stockwell |
| 3,450,281 A | 6/1969 | Groberg |
| 3,563,162 A | 2/1971 | Monroe |
| 3,572,521 A | 3/1971 | Grey et al. |
| 3,788,495 A | 1/1974 | Fachini et al. |
| 3,848,758 A | 11/1974 | Carter |
| 3,884,367 A | 5/1975 | Butler et al. |
| 3,897,880 A | 8/1975 | Waske et al. |
| 3,923,176 A | 12/1975 | Wynn et al. |
| 3,938,682 A | 2/1976 | Rowe |
| 3,942,666 A | 3/1976 | Pfremmer |
| 3,999,674 A | 12/1976 | Meitl |
| 4,050,598 A | 9/1977 | Schurz |
| 4,067,393 A | 1/1978 | Szarkowski |
| 4,068,804 A | 1/1978 | Butler et al. |
| 4,069,926 A | 1/1978 | Jackson et al. |
| 4,073,532 A | 2/1978 | Blair |

(Continued)

FOREIGN PATENT DOCUMENTS

BE 737495 1/1970

(Continued)

*Primary Examiner*—Donald Underwood
(74) *Attorney, Agent, or Firm*—Dowrey & Associates

(57) ABSTRACT

An L-shaped platform having a vertical bale gripping frame and a horizontal bale support deck is mounted on a transport vehicle for rotation through 90° from a transport position to a bale pick-up position. In the pick-up position, tines on the gripping frame engage the top of the bale and hold the bale with the support deck in contact with an adjacent side surface. The platform is rotated to return to the transport position with the bale being supported by the support deck. The support deck includes a cross conveyor for discharging the bale laterally for stock feeding.

22 Claims, 5 Drawing Sheets

U.S. PATENT DOCUMENTS

| | | | |
|---|---|---|---|
| 4,089,425 | A | 5/1978 | Baltz |
| 4,103,794 | A | 8/1978 | Shaw |
| 4,227,845 | A | 10/1980 | Colby et al. |
| 4,259,035 | A | 3/1981 | De Coene et al. |
| 4,261,676 | A | 4/1981 | Balling, Sr. |
| 4,325,666 | A | 4/1982 | Chain et al. |
| 4,326,827 | A | 4/1982 | McNutt |
| 4,360,167 | A | 11/1982 | Beccalori et al. |
| 4,370,796 | A | 2/1983 | Wilson |
| 4,376,607 | A | 3/1983 | Gibson |
| 4,411,573 | A | 10/1983 | Townsend |
| 4,498,830 | A | 2/1985 | Seymour et al. |
| 4,548,535 | A | 10/1985 | van Die |
| 4,564,325 | A | 1/1986 | Ackerman |
| 4,594,041 | A | 6/1986 | Hostetler |
| 4,597,703 | A | 7/1986 | Bartolini |
| 4,643,625 | A | 2/1987 | Horner |
| 4,778,322 | A | 10/1988 | Stronski |
| 4,789,289 | A | 12/1988 | Wilson |
| 4,892,259 | A | 1/1990 | von der Heide |
| 4,911,596 | A | 3/1990 | Fetter |
| 4,952,111 | A | 8/1990 | Callahan |
| 4,981,407 | A | 1/1991 | Johnson |
| 4,982,658 | A | 1/1991 | Knudson |
| 5,025,992 | A | 6/1991 | Niebur |
| 5,033,683 | A | 7/1991 | Taylor |
| 5,062,757 | A | 11/1991 | Eichenauer |
| 5,082,413 | A | 1/1992 | Grosz et al. |
| 5,090,630 | A | 2/1992 | Kopecky et al. |
| 5,211,345 | A | 5/1993 | Siebenga |
| 5,288,193 | A | 2/1994 | Warburton et al. |
| 5,333,981 | A | 8/1994 | Pronovost et al. |
| 5,340,040 | A | 8/1994 | Bussiere et al. |
| 5,340,259 | A | 8/1994 | Flaskey |
| 5,405,229 | A | 4/1995 | Tilley et al. |
| 5,445,490 | A | 8/1995 | Whitehead |
| 5,496,144 | A | 3/1996 | Wetz |
| 5,507,612 | A | 4/1996 | Siebenga |
| 5,542,803 | A | 8/1996 | Driggs |
| 5,547,334 | A | 8/1996 | Baril |
| 5,607,274 | A | 3/1997 | Cook |
| 5,690,461 | A | 11/1997 | Tilley |
| 5,695,311 | A | 12/1997 | Miguel et al. |
| 5,738,287 | A | 4/1998 | Vanderberg |
| 5,813,616 | A | 9/1998 | Vandervalk |
| 5,829,940 | A | 11/1998 | Mahaney |
| 5,846,046 | A | 12/1998 | Warburton |
| 5,895,001 | A | 4/1999 | Kuelker et al. |
| 5,954,468 | A | 9/1999 | Marshall |
| 5,997,233 | A | 12/1999 | Whatley et al. |
| 6,099,234 | A | 8/2000 | Mason |
| 6,116,838 | A | 9/2000 | Whatley et al. |
| 6,171,047 | B1 | 1/2001 | Vandervalk |
| 6,312,205 | B1 | 11/2001 | Vandenberg |
| 6,328,520 | B1 | 12/2001 | Maclay |
| 6,540,464 | B1 | 4/2003 | Maclay |
| 6,695,560 | B2 | 2/2004 | Maclay |
| 6,764,274 | B2 | 7/2004 | Maclay |

FOREIGN PATENT DOCUMENTS

| | | |
|---|---|---|
| CA | 2167664 | 1/1996 |
| CA | 2191692 | 11/1996 |
| GB | 2011346 A | 6/1979 |
| GB | 2273280 | 6/1994 |
| WO | WO 86/07234 | 12/1986 |
| WO | WO 03/081985 A1 | 9/2003 |

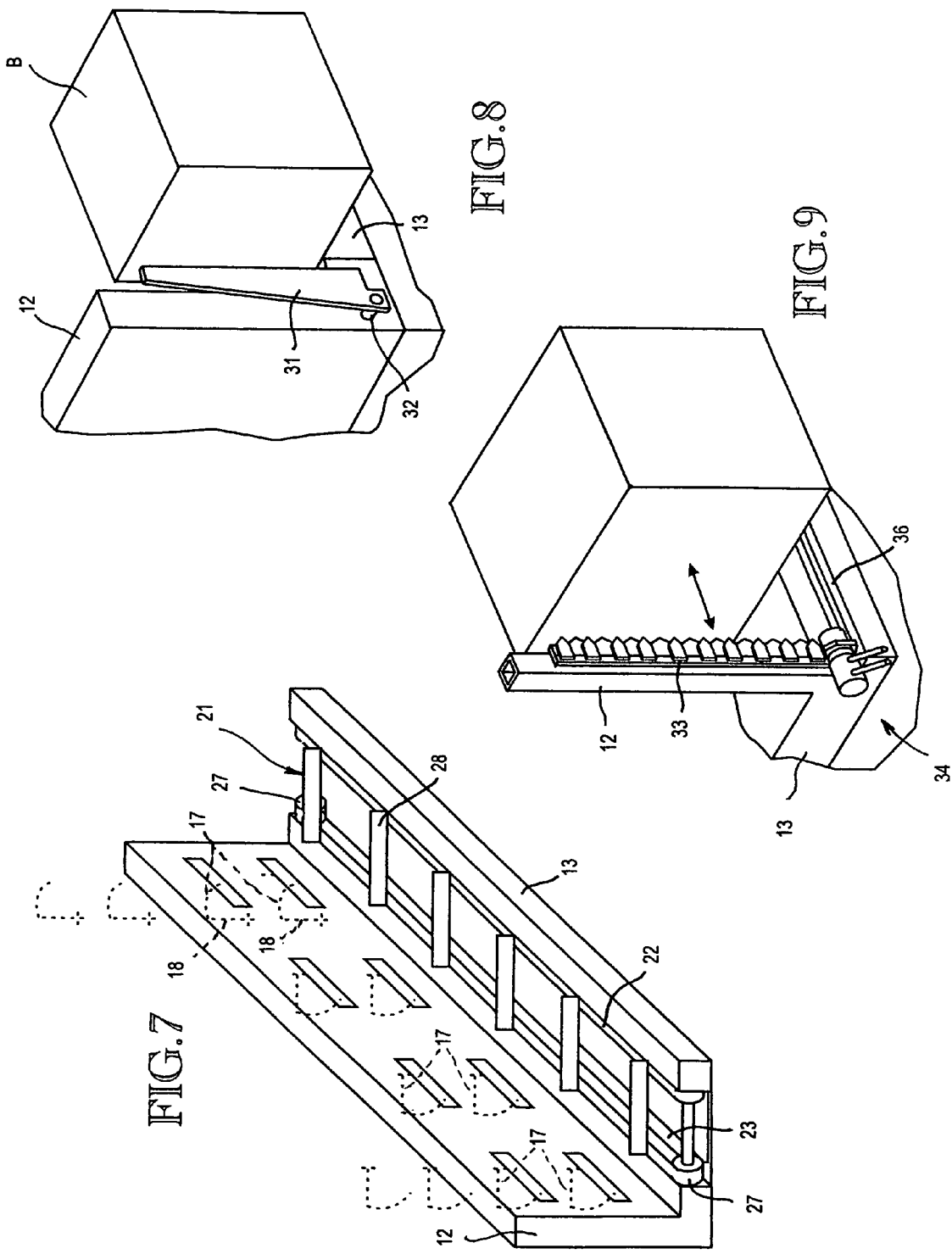

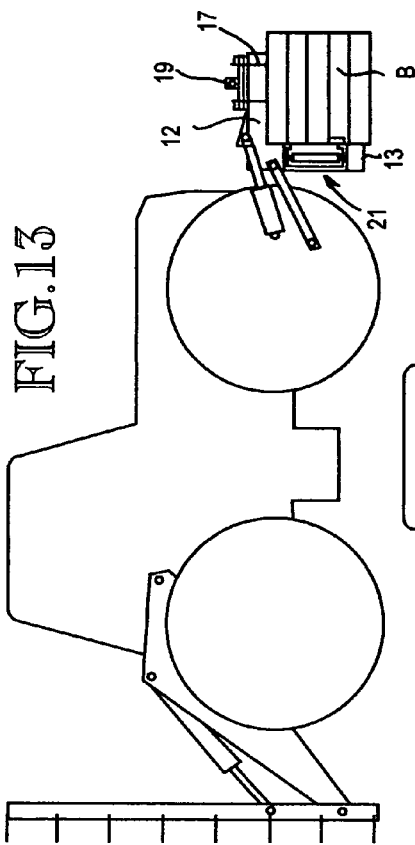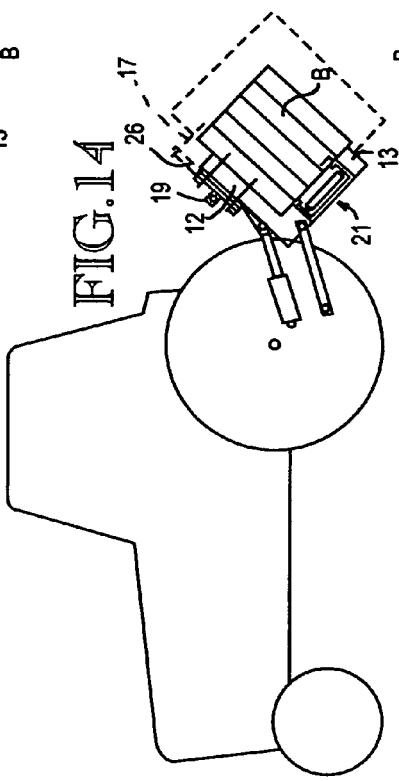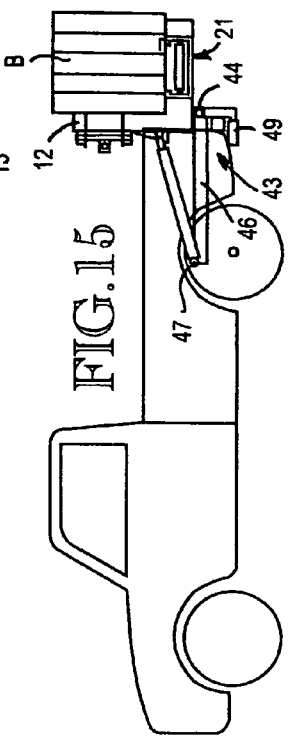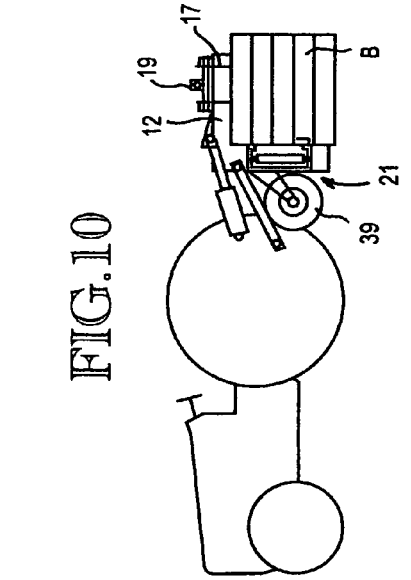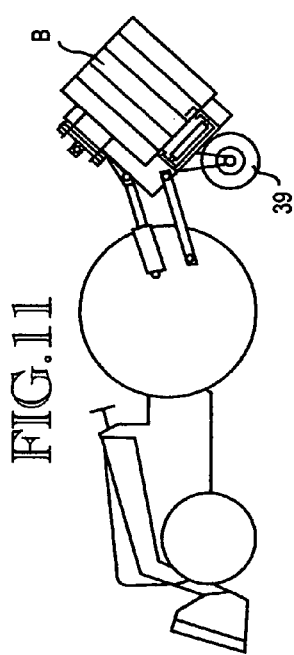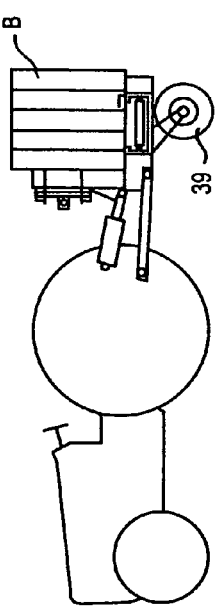

VEHICLE MOUNTED BALE PICK-UP AND FEEDER

CROSS REFERENCE TO RELATED APPLICATIONS

The present application is a continuation of my prior pending patent application Ser. No. 10/508,382, filed Sep. 20, 2004 as a National Stage Entry of my PCT Application No. PCT/US03/08870, filed Mar. 21, 2003, claiming priority from my U.S. Provisional application Ser. No. 60/367,538, filed Mar. 22, 2002.

BACKGROUND OF THE INVENTION

1. Field of the Invention

The present invention relates to handling of bales of bulk material such as hay or silage and includes the pick-up and loading of such bales onto to a vehicle mounted platform or deck with subsequent break-up and discharge of the bulk material for animal feeding. Although not restricted to any particular bale size, the invention is especially pertinent to the handling of extremely large bales of the type described which are too heavy to be handled manually and, in particular, large rectangular cross section hay bales. A generally L-shaped platform includes a bale engaging and lifting frame means for engaging one side of a rectangular bale and a conveyor mechanism for engaging an adjacent side for supporting the bale when moved to the loaded position of the platform and subsequent bale discharge.

2. Description of the Prior Art

In recent years the trend in preserving hay bales has been toward increasingly large size bales, far beyond the ability for manual handling. Although large round bales, several feet in diameter, have been developed and equipment has been designed either to simply unroll the layered bale and/or perform a chopping operation for pasture or range feeding, the results have not been entirely satisfactory. More recently, the trend has been toward the formation of large rectangular or square cross section bales for more ease of transport and stacking. Equipment has been developed such as disclosed in my co-pending U.S. patent application Ser. No. 09/370,359, Vehicle Mounted Large Bale Loading, Transporting And Unloading System, now U.S. Pat. No. 6,328,520 B1, issued Dec. 11, 2001 and Ser. No. 09/721,599, Loading Grapple Table, now U.S. Pat. No. 6,540,464, issued Apr. 1, 2003, for loading, transporting and unloading bales of this type to either form stacks of multiple bales or to transport multiple large bales and to distribute or unload individual bales for pasture, range or bunk feeding. The equipment for accomplishing this task is designed essentially of large capacity and complexity for handling the shear weight and size of the multiple large bales. The need has arisen for single bale pick-up, transport and feeding functions for small farms utilizing smaller sized existing equipment such as tractors, trailers and small trucks.

SUMMARY

The present invention contemplates a generally L-shaped platform having an upright bale gripping frame structure and a generally horizontal deck or support surface. The platform engages a square or rectangular cross section bale while in a ground or platform supported position and lifts it to an above-ground elevated position for break-up and dispensing as the vehicle moves. The broken bale material may be deposited on the ground or other surface suitable for feeding animals. The L-shaped platform is adapted to be mounted on a wide variety of transport vehicles such as on a suitable three-point tractor hitch system, either in the front or rear end of Category I, II and III existing tractor hitches; on the rear end of small vehicles such as pick-up trucks, or; on wheeled trailers and the like. The L-shaped frame is carried on the vehicle in a transport position with the gripping frame extending generally vertically and the bale support deck at right angles thereto, extending generally horizontally.

In the preferred embodiment, the gripping frame is equipped with multiple bale engaging grapple hooks or other bale engaging mechanisms for grasping and lifting a bale from the ground and the deck or bale support section is equipped with conveyor means for moving the loaded bale transversely of the platform to dispense the broken bale to one side of the moving vehicle. The platform is pivoted between the transport position and a pick-up position with the gripping frame extending generally horizontally and the grapple means engaging the top and/or sides of the bale. In this position, the conveyor on the support deck engages an adjacent side of the bale. A single bale is thus gripped, pivoted through an approximate 90° angle and transported and unloaded.

In one embodiment, suitable for category I three point hitches of small farm tractors, the pivoting platform may be equipped with ground engaging wheels which pivot with the platform and engage the ground for additional support when the platform is in the transport position. With this modification, small tractors are capable of transporting large bales which otherwise exceed the lift capacity of the three point hitch system of the tractor. In the alternative the pivoting platform may be carried on a separate wheeled trailer for support, the trailer being pulled by a tractor or other tow vehicle. With this equipment, the utilization of large rectangular bales in small farm operations, such as horse farms and the like, becomes practical. In addition to the cross conveyor on the platform deck, cut-off devices for insuring the break up of the bale as it is dispensed may be mounted as part of the pivoting platform. Such cut-off devices may comprise small sickle bars, rotating arm structures or even ram shears such as illustrated in my co-pending application Ser. No. 09/370,359. Although the cut bale will normally break in natural "flakes" as the bale is advanced over the side of the conveyor, such conditions as freezing weather may require the use of a cut-off device to aid in breaking the bale apart.

BRIEF DESCRIPTION OF THE DRAWINGS

FIG. 7 is a perspective schematic view illustrating the placement of the bale transport conveyor on the support deck and grapple hooks on the gripping frame of the platform;

FIG. 8 is a perspective schematic view showing the use of the pivoted-bar cut-off device for assisting the breaking up of the bale as it moves over the end of the cross conveyor;

FIG. 9 is a perspective schematic view of the placement of a sickle bar device for assisting in the breaking up of the bale;

FIGS. 10-12 are schematic illustrations of the sequence of positions of the bale engaging platform with support wheels during pick-up and transport;

FIG. 13 is a schematic illustration of the bale engaging platform in the pick-up position as mounted on the front end of a large tractor;

FIG. 14 is a schematic view similar to FIG. 13 with the bale engaging platform mounted on the three point hitch of the rear end of a large tractor; and FIG. 15 is schematic illustration of the bale engaging platform mounted on the ball hitch of a pick-up truck.

DESCRIPTION OF THE PREFERRED EMBODIMENTS

Figure 1:
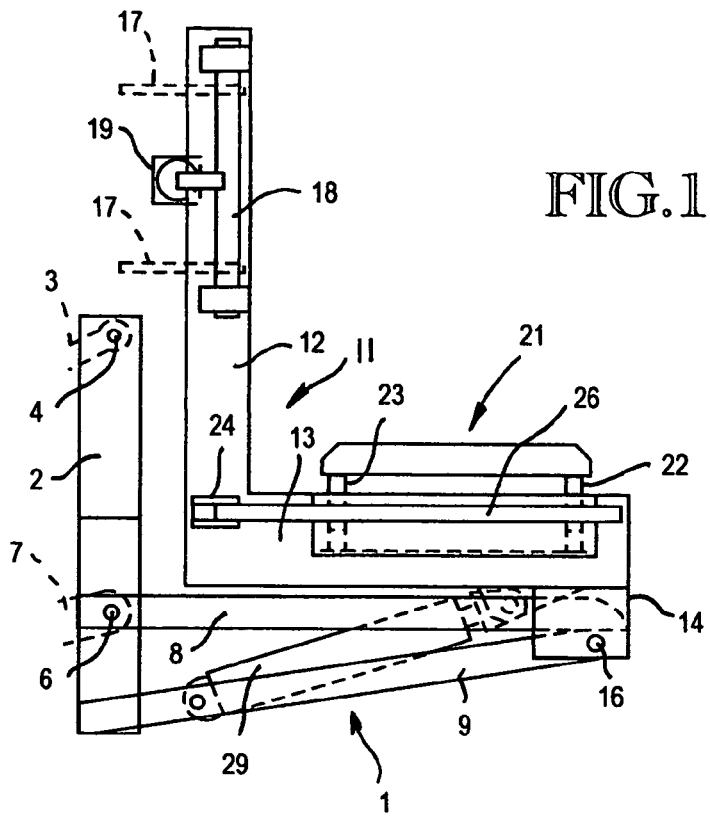
FIG. 1 is a side elevational view of the bale engaging platform in its transport position as mounted on a large category II or III tractor three point hitch.
Figure 2:
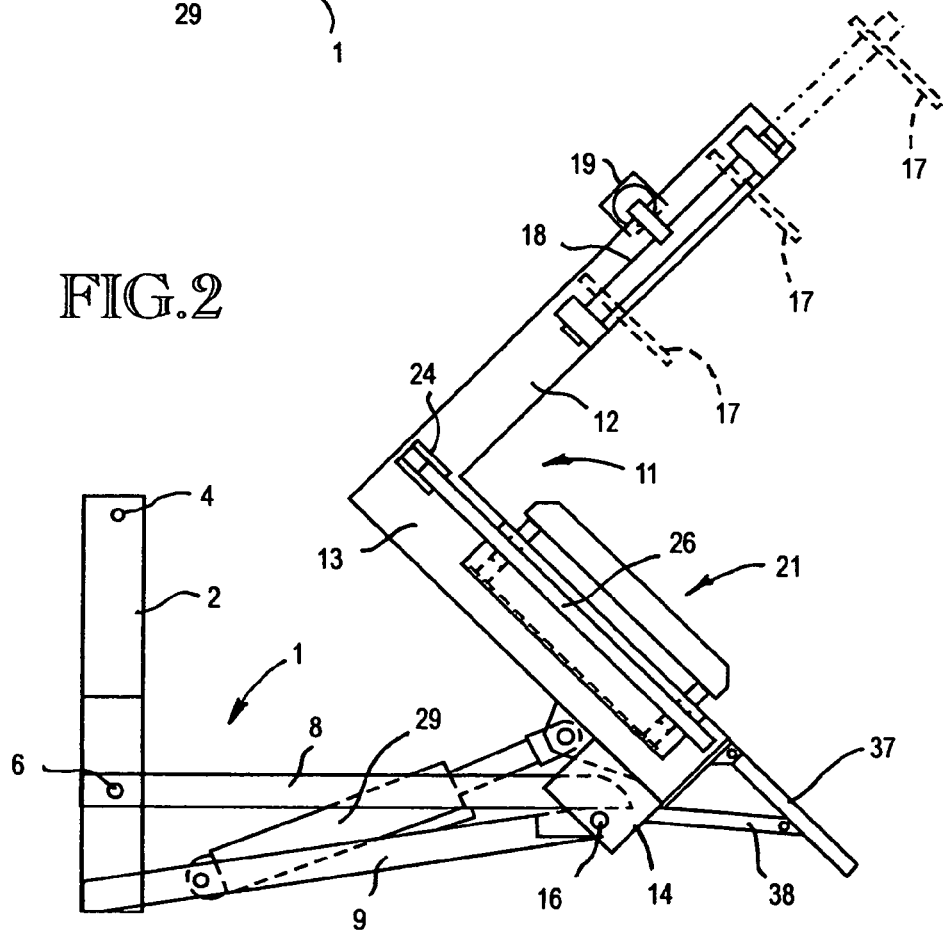
FIG. 2 is a side elevational view of the bale engaging platform pivoted toward the pick-up position.

FIGS. 1 and 2 illustrate the bale engaging pick-up and support platform system as mounted on a transport vehicle, in this case, the three point hitch of a tractor of the size and capacity capable of supporting the platform mechanism as well as a large rectangular cross section bale. Although the weight and dimensions of individual larger bales will vary, the larger bales may have a cross section of up to 4×4 feet and a length in the neighborhood of 8 feet with a weight in the range of 1000-2000 pounds per bale. The illustrated system includes a frame generally indicated at 1 designed to be connected to the three point hitch of the tractor. The frame 1 includes a mast frame 2 with a suitable clevis for pivotal attachment to the upper arm 3 of the tractor hitch at the pivot point 4. The lower end of the mast 2 is provided with stub shafts 6 for pivotal connection to the lower laterally spaced lift arms 7 of the tractor three point hitch. The mast frame structure and its connection to the tractor three point hitch is a well known standard arrangement and allows the pick-up and transfer platform to be adjusted for vertical elevation. It will be understood of course that the details of the mast structure 2 and its connection to the three point hitch of the tractor may be varied without departing from the present invention.

Horizontal support structures 8 are rigidly connected at their inner ends to the mast structure 2 and extend outwardly therefrom at right angles. The structures 8 may be braced for vertical support by the braces 9 so as to form a rigid shelf or base support frame for supporting the pivoted pick-up and support platform. It will be understood that the members 8 and 9 may be connected by any suitable bracing structures in order to provide the support shelf. The L-shaped platform is schematically illustrated and indicated generally at 11 in FIGS. 1 and 2. The platform 11 includes the vertical grapple frame 12 and the conveyor deck 13 which may be constructed of any desired arrangement of frame members either welded or otherwise rigidly attached to form the platform which is pivoted to the forwardly extending support shelf at its outer end by means of a suitable bracket 14 as at 16. It will be understood that a sufficient number of brackets 14 will be provided along the length of the conveyor deck 13 in order to adequately support and pivot the loaded platform.

FIGS. 1, 2 and 7 illustrate a typical grapple hook arrangement for placing the grapple frame in lifting engagement with a hay bale when the platform is in the bale pick-up position as will be presently described. A plurality of grapple hooks 17 may be carried on a rotatable actuator shaft 18 with the shaft 18 being rotated by a suitable motor 19 mounted on the frame member 12. It will be understood, of course, that any suitable motor means, such as hydraulic, pneumatic or electric, may be used to actuate the grapple hooks. The grapple hooks or tines 17 and their mode of mounting and operation are well known in the art and may be of any chosen type including those illustrated in my co-pending patent application Ser. No. 09/370,359 now U.S. Pat. No. 6,328,520 B1, issued Dec. 11, 2003 and Ser. No. 09/721, 599, now U.S. Pat. No. 6,540,464, issued Apr. 1, 2003. Although FIGS. 1 and 2 illustrate the use of two grapple hooks on the operating shaft 18, it will be understood that each side of the grapple frame 12 will include identical grapple hook structures for engaging the ends or midsection of the bale to be lifted. FIG. 2 illustrates the expedient of using an extended shaft 18 shown in dotted lines to increase the number of grapple hooks on each end of the frame. Likewise FIG. 7 illustrates the use of twelve such grapple hooks which extend through the grapple frame 12, shown schematically, and are withdrawn to a position away from the bale once it is loaded. The number and placement of grapple hooks will depend upon the size of the large rectangular bale to be lifted. In any event, the grapple hooks will penetrate the ends of the bale and/or the midsection of the top surface of the bale when the platform is in the pick-up position. It is also understood to be within the scope of the present invention to substitute other known types of bale gripping means for the hooks 17.

The conveyor deck 13 is also shown in detail in FIGS. 1, 2 and 7 and may include any of several types of available conveyors such as chain, belt, pusher plate or the like. The conveyor serves to move the bale across the surface of the conveyor deck 13 to discharge the bale to one side of the tractor as it moves once the bale ties have been cut. The particular conveyor assembly 21 illustrated is of the endless chain type including two laterally space chains 22 and 23. The chains 22 and 23 may be driven by any suitable motor means such as a hydraulic motor 24 or its equivalent for powering a drive shaft 26. The drive shaft 26 will be connected to drive the chain through suitable sprockets 27. The customary flights 28 span the drive chains and contact the bottom of the bale to move the bale during unloading. Suitable controls (not shown) will enable the tractor operator to operate the various motors for the conveyor, the grapple hooks and the pivoting of the platform which is moved between the bale loaded position and pick-up position by means of the hydraulic cylinder 29 which extends between the brace 9 and the bottom side of the conveyor deck 13 as clearly shown in FIGS. 1 and 2.

FIGS. 8 and 9 illustrate only two of many possible cut-off devices that can be mounted to the discharge side of the platform 11 to aid in separating layers or flakes of hay from the bale in the event such assistance is required. As shown in FIG. 8, a rotatable arm or cut-off blade 31 is mounted on a rotatable shaft 32 for swinging motion under control of a suitable motor means (not shown) to engage the protruding end of the bale B as it is moved outwardly over the edge of the conveyor 21. FIG. 9 shows an alternative form of cut-off means which includes a well known sickle bar assembly 33 which is moveable in a linear path as indicated by the arrow in FIG. 9 to engage the protruding end of the bale. The sickle bar 33 may be driven by any suitable means such as an hydraulic or electric motor assembly 34 with suitable means, such as hydraulic or pneumatic cylinder and track assembly 36. Reference may be had to my co-pending patent application Ser. No. 09/370,359, now U.S. Pat. No. 6,328,520 B1, for the details of such an assembly.

FIG. 2 also illustrates the use of an extension plate 37 which may be pivotally attached to the front surface of the conveyor deck to extend the deck for use with extremely large size bales. The plate 37 may be supported in place by means of braces or the like 38 extending between the plate and the deck frame. It will be understood, of course, that similar extension plates may be utilized on the opposite ends of the conveyor deck to accommodate extremely long bales, as shown in FIG. 3.

FIGS. 13 and 14 illustrate the use of the FIGS. 1 and 2 embodiment of the L-shaped platform on both the front end and the rear end of a large size tractor. As seen in FIG. 13 the platform is pivoted to the bale engaging position with the grapple hooks 17 in position above the top surface of the bale B and the conveyor deck 21 in engagement with the adjacent side surface of the bale. The grapple hooks 17 are then actuated to engage the bale as shown in FIG. 14 and the bale is held against the platform as the platform is rotated through its approximately 90° arc to the transport position. When it is desired to unload and distribute the hay from the bale, the bale ties are cut and the conveyor assembly 21 is actuated to slowly or incrementally feed the bale over the side of the conveyor deck to allow the bale to separate and fall to the ground as the tractor moves forward. As previously described, a cut-off device may be installed on the platform to aid in breaking the bale apart if such is necessary.

Figure 3:
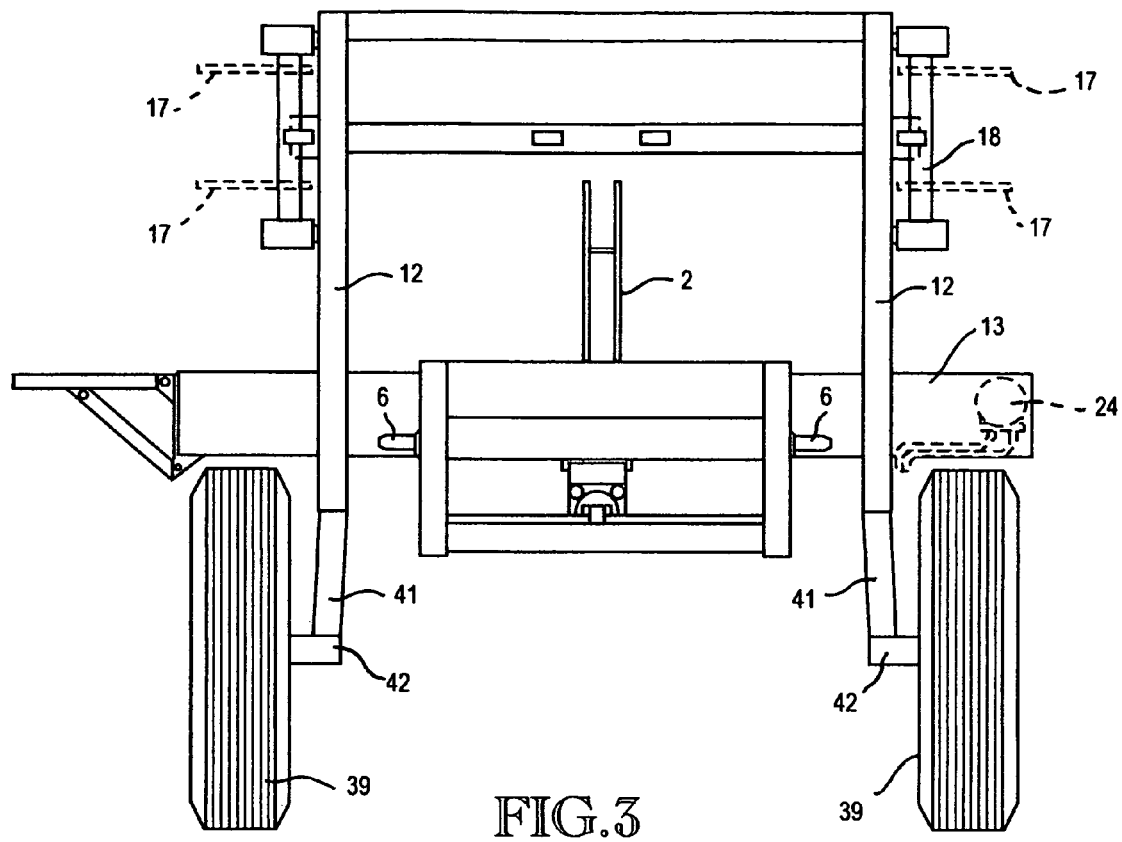
FIG. 3 is an end elevational view of the bale engaging platform designed for use with a category I small tractor three point hitch and including support wheels.
Figure 4:
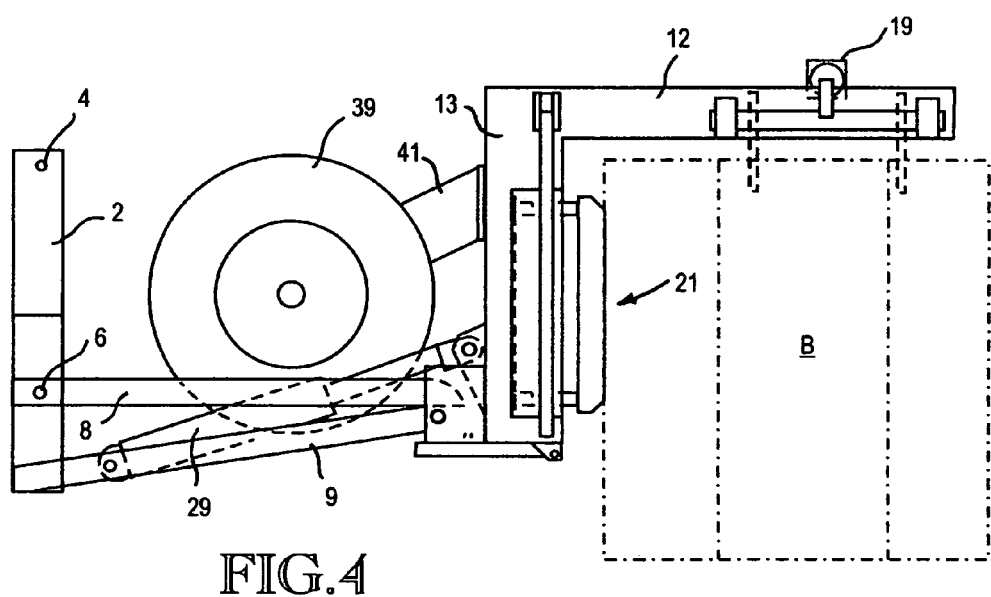
FIG. 4 is a side elevational view of the bale engaging platform of FIG. 3 in its fully pivoted bale pick-up position.

FIGS. 3 and 4 illustrate a second embodiment of the invention which adapts the pick-up and transport platform to be mounted on a small farm tractor which may not have the load carrying capacity to lift and support a large bale. Although such tractor lift mechanisms are capable of safely lifting the weight of the platform and bales weighing in the neighborhood of 500 pounds, additional support is required in the transport position. As illustrated in FIGS. 3 and 4, the three point hitch attachment frame and mast 2, along with the horizontal support structures 8 and 9, may be in all respects be identical to that described in the FIGS. 1 and 2 embodiment. Likewise, the L-shaped pick-up and transport platform including the grapple frame 12 and conveyor deck 13 may be identical to that previously described. In addition to these structures, provision is made for attachment of the ground support wheels 39 beneath the conveyor deck 13 by means of suitable support arms 41 and stub axle units 42. These structures may be connected to the grapple frame and conveyor deck in any suitable manner within the skill of an artisan. With this arrangement, the ground wheels 39 will pivot along with the platform so as to engage the ground beneath the platform when the platform is in the transport position.

FIGS. 10-12 illustrate the sequence of positions of the pick-up and transport platform during the loading and transporting of a single large bale. As illustrated in FIG. 10, the platform is rotated to the pick-up position and lowered to engage the bale with the conveyor deck contacting the vertical surface of the bale and the grapple or bale gripping frame in contact with the top or adjacent side of the bale. In this position, the grapple hooks 17 are rotated so as to engage the bale B as shown in FIG. 11. The platform is then rotated so as to lift the bale and simultaneously, the ground wheels 39 are caused to rotate downwardly into contact with the ground to support the bale B in the transport position shown in FIG. 12. The grapple hooks are then retracted and the bale is ready for unloading by the conveyor 21.

Figure 5:
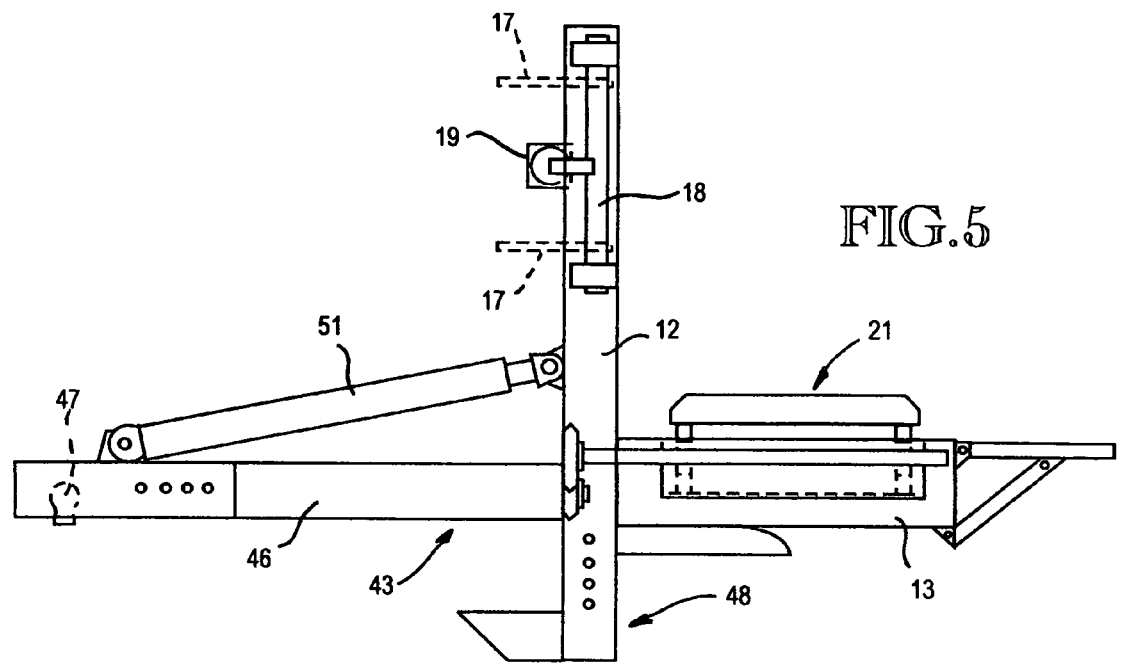
FIG. 5 is a side elevational view of an embodiment of the bale engaging platform adapted for mounting on a truck bed utilizing a ball hitch.

FIG. 5 illustrates yet another embodiment of the pick-up and transport platform designed for mounting on the bed of a trailer or small truck such as a pick-up truck, in this instance having a bed mounted ball hitch for normally receiving a goose-neck trailer tongue. The grapple frame 12 and conveyor deck assembly 13 may be identical to that previously described, however, the platform is pivoted to the outboard end of an elongated frame structure 43 as at 44 shown in FIG. 15 for pivoting through the 90° angle necessary to engage and pick-up the bale B. The frame 43 includes an elongated beam or frame 46 which is connected at its forward end to the goose-neck ball hitch 47 on the pick-up truck bed. The outboard end of the frame 46 includes a bumper engaging clamp 48 which engages the bumper 49 of the pick-up truck as shown in FIG. 15. With this arrangement, the structure 48 engages the bumper or other structure on the end of the truck bed and, once the forward end of the beam 46 is attached to the ball 47, the platform is rigidly mounted on the truck bed. A hydraulic ram 51 extends between the grapple frame 12 and the forward end of the beam 46 to impart the 90° pivoting motion to the platform 11 as previously described.

Figure 6:
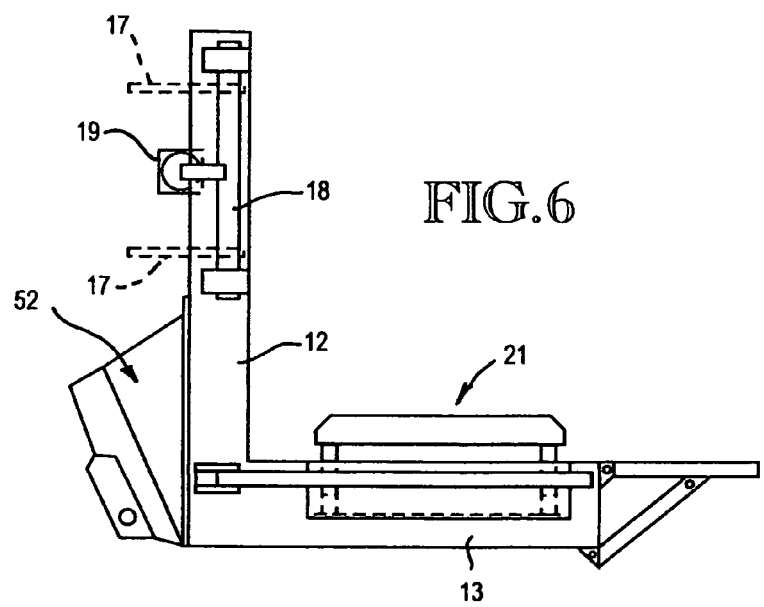
FIG. 6 is a side elevational view of still another embodiment of the bale engaging platform adapted for mounting on the bucket of a tractor front-end loader.

FIG. 6 illustrates an adaptation wherein the L-shaped frame including the grapple frame 12 and conveyor deck 13 are rigidly attached directly to the bucket 52 or other structure on the tractor front end loader. The conventional hydraulic ram controlled bucket and loader assembly is capable of pivoting the bucket and thus the L-shaped pick-up and support platform through a 90° angle and to raise and lower the platform so as to engage a bale resting on the ground in the manner previously described and to transport the bale to an unloading location.

While the preferred embodiments of the invention have been described herein it is to be understood that the foregoing description and accompanying drawings have been given by way of illustration and example. Variations in design and arrangement of parts may be made without departure from the scope and spirit of the present invention. For example, electrical, hydraulic or pneumatic motor means or manual operated means may be substituted for the various motors described or a combination of electrical, pneumatic, hydraulic motor means and manual operation may be utilized to perform the various operations described. The present invention is not intended to be limited to any particular type of motor vehicle, trailer or the conveyance. Changes in form of the several parts, substitution of equivalent elements and arrangement of parts which will readily be apparent to one skilled in the art, are also contemplated as within the scope of the present invention.

What is claimed is:

1. Transport vehicle mounted apparatus for handling bales of bulk material having a top bale gripping surface and opposite side surfaces adjacent thereto, comprising;

a base support structure, mounting means for mounting said base support structure on a transport vehicle, an L-shaped platform including a bale gripping frame with bale gripping means thereon positioned to engage the top surface of a bale to be handled and a bale support deck extending at substantially right angles thereto positioned to engage one said adjacent side surfaces of the bale, said L-shaped platform being mounted for pivotal movement on said base structure through approximately 90° between a transport position with said bale gripping frame extending substantially vertical and a bale pick-up position with the bale gripping frame extending substantially horizontal to engage said bale gripping means with the top surface of a bale to be picked up, platform positioning means for moving said L-shaped platform between said transport position and said bale pick-up position, whereby said platform is moved to the bale pick-up position with the gripping means positioned to engage the top surface of a bale and with the bale support deck in contact with one of said adjacent opposite side surfaces thereof, said platform is then moved through approximately 90 ° to the transport position with the bale being supported by the bale support deck.

2. A method for the pick-up and loading of bales of bulk material having a top surface, opposite side surfaces and opposite end surfaces adjacent thereto, said top and end surfaces each comprising a bale gripping surface, the side surfaces being parallel to the longitudinal axis of the bale, said method comprising;

mounting a bale pick-up and support platform in a bale support position on a base structure with a bale gripping frame thereon oriented in an upright generally vertical position and a bale support deck extending therefrom in a generally horizontal position, rotating said platform to a bale pick-up position in a first direction to engage the gripping frame with at least one said bale gripping surfaces and the bale support deck in non surface-penetrating contact with one of said adjacent side surfaces, actuating said gripping frame to secure the bale thereto, rotating said platform in the opposite direction from said bale pick-up position to said bale support position, releasing said bale gripping frame from the bale to support said bale on said bale support deck, and removing said bale from the bale support deck in a direction generally parallel to the longitudinal axis of the bale.

3. The method of claim 2 wherein said bale support deck includes a bale conveyor, said method further including the steps of;

mounting said pick-up and support platform on a transport vehicle, and operating said bale conveyor to discharge the bale from said platform in a lateral direction relative to the direction of travel of the vehicle.

4. The method of claim 3 further including the step of;

separating the bale into discrete units during discharge from the conveyor to distribute the material during travel of the vehicle.

5. The method of claim 4 wherein said bale is separated during discharge by contacting the bale with a cut-off device mounted on said platform adjacent said bale conveyor.

6. The method of claim 3 further including the step of;

engaging said gripping frame on the top surface of said bale.

7. The method of claim 6 further including the step of;

additionally engaging said gripping frame on at least one of said end surfaces of said bale.

8. Apparatus for handling bales of bulk material, said bale having a top surface and opposite side and end surfaces adjacent thereto, said side surfaces being parallel to the longitudinal axis of the bale and said top and end surfaces comprising bale gripping surfaces;

a base support structure, a bale pick-up and support platform including a bale gripping frame with bale gripping means thereon and a bale support deck extending therefrom, said platform being mounted for pivotal movement on said base structure between a bale support position with the gripping frame extending generally upright and a bale pick-up position with the gripping frame positioned to engage said gripping means with at least one said bale gripping surfaces of a bale, the support deck being positioned to engage one of said adjacent side surfaces of the bale in non surface-penetrating contact, and selectively operable platform positioning means connected to move said platform to the bale pick-up position and return the platform to the bale support position with the bale being supported on said bale support decks, whereby said bale is removable from said deck in a direction generally parallel to the longitudinal axis of the bale.

9. The apparatus of claim 8 wherein said bale gripping means includes at least one bale piercing tine structure, a tine actuator mounted on said gripping frame, said at least one bale piercing tine being mounted on said actuator for movement between a bale engaging position and a retracted position for releasing said bale for support by said support deck.

10. The apparatus of claim 9 wherein;

said tine actuator includes a rotatable tine support shaft, motor means for selectively rotating said shaft to move said at least one tine structure between the bale engaging position and the retracted position.

11. The apparatus of claim 10 including;

a plurality of tine structures mounted in spaced relation on said support shaft.

12. The apparatus of claim 11 wherein said tine actuator includes a plurality of tine support shafts, said tine structures being positioned on said support shafts to engage both the end surfaces and top surface of a bale to be picked up.

13. The apparatus of claim 9 including;

mounting means for mounting said base support structure on a transport vehicle, a bale conveyor carried on said bale support deck and extending transversely to the direction of travel of said vehicle, selectively operable drive means for operating said conveyor to discharge the bale from said support deck in a lateral direction relative to the direction of travel of said vehicle.

14. The apparatus of claim 13 wherein said drive means comprises;

incremental motor drive means for discharging said bale in increments during forward travel of said vehicle.

15. The apparatus of claim 13 wherein said bale pick-up and support platform is L-shaped, said base support structure comprising;

a base frame including a horizontal section providing a pivotal connection for said L-shaped platform and a vertical mast section, said mast section and said horizontal section providing connection points for the three-point hitch system of a tractor vehicle, and said platform positioning means includes ram means acting between said horizontal frame section and said L-shaped platform for pivoting the platform between the transport position and the bale pick-up position.

16. The apparatus of claim 15 including;
support wheels connected to said bale support deck,
said support deck including a top side for mounting said material conveyor and a bottom side for connection to the support wheels,
said support wheels being so positioned as to bear at least a portion of the weight of a bale carried on said deck in the transport position.

17. The apparatus of claim 13 wherein said bale pick-up and support platform is L-shaped, said base support structure comprising;
an elongated base frame member,
means to secure said base frame to a horizontal surface of a transport vehicle, and
said platform positioning means includes ram means acting between said elongated base frame member and said L-shaped platform for pivoting the platform between the transport position and the bale pick-up position.

18. The apparatus of claim 13 wherein said bale pick-up and support platform is L-shaped, said base support structure comprising a pivotally mounted working unit carried by the front end loader apparatus of a tractor and having a portion thereof oriented for movement through at least 90° from the vertical to the horizontal,
said L-shaped platform being rigidly connected to said working unit for pivotal movement between the transport position and the bale pick-up position.

19. The apparatus of claim 13 wherein said bale pick-up and support platform is L-shaped and further including;
bale cut-off mechanism carried by said L-shaped platform adjacent the discharge end of said material conveyor,
said cut-off mechanism having a separator for contacting a bale being discharged to ensure incremental separation thereof during discharge, and
motor means for selectively actuating said cut-off mechanism to form spaced piles as the transport vehicle moves forward.

20. A method for loading and transporting a bale of bulk material comprising;
mounting an L-shaped bale support and pick-up platform on a transport vehicle in a transport position with a bale gripping frame thereon oriented generally vertical and a bale support deck thereon oriented generally horizontal,
rotating said platform to a bale pick-up position in a first direction to engage the gripping frame with a bale and the support deck in contact with a side surface thereof,
actuating said gripping frame to secure the bale thereto,
rotating said platform in the opposite direction to the transport position, and
supporting said bale on said bale support deck for transport.

21. Transport vehicle mounted apparatus for handling bales of bulk material having a top surface and opposite side surfaces adjacent thereto, comprising;
a base support structure,
mounting means for mounting said base support structure on a transport vehicle,
an L-shaped platform including a bale gripping frame with bale gripping means thereon positioned to engage the top surface of a bale to be transported and a bale support deck extending at substantially right angles thereto,
said support deck including a support surface positioned for non surface-penetrating contact with one said side surfaces,
said L-shaped platform being mounted for pivotal movement on said base structure between a transport position with said bale gripping frame extending substantially vertical and a bale pick-up position with the bale gripping frame extending substantially horizontal to engage said bale gripping means with the top surface of a bale to be picked up and said support surface in contact with one said side surfaces,
platform positioning means for moving said L-shaped platform between said transport position and said bale pick-up position,
whereby said platform is moved to the bale pick-up position with the gripping means positioned to engage the top surface of a bale and with the bale support deck in non surface-penetrating contact with one of said adjacent opposite side surfaces thereof, said platform is then moved to the transport position with the bale being supported by the bale support deck and removable from said support deck in a direction transverse to the direction of travel of said transport vehicle.

22. The method of claim 20 further including the steps of;
releasing said bale gripping frame from the bale, and
removing said bale from said bale support deck in a lateral direction relative to the direction of travel of the transport vehicle.

* * * * *